US010208197B2

(12) United States Patent
Baek et al.

(10) Patent No.: US 10,208,197 B2
(45) Date of Patent: *Feb. 19, 2019

(54) PVC-BASED COMPOUND COMPOSITION

(71) Applicant: HANWHA CHEMICAL CORPORATION, Seoul (KR)

(72) Inventors: Sung Hyub Baek, Daejeon (KR); Ji Woo Kim, Daejeon (KR); Hyeok Chil Kwon, Daejeon (KR); Jee Hyoung Lee, Daejeon (KR); Sang Hyun Cho, Daejeon (KR); Kwang Heon Hyun, Ulsan (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 331 days.

This patent is subject to a terminal disclaimer.

(21) Appl. No.: 15/033,690

(22) PCT Filed: Nov. 25, 2014

(86) PCT No.: PCT/KR2014/011373
§ 371 (c)(1),
(2) Date: May 2, 2016

(87) PCT Pub. No.: WO2015/088164
PCT Pub. Date: Jun. 18, 2015

(65) Prior Publication Data
US 2016/0272804 A1 Sep. 22, 2016

(30) Foreign Application Priority Data
Dec. 9, 2013 (KR) .................. 10-2013-0152473

(51) Int. Cl.
*B32B 3/10* (2006.01)
*C08L 27/06* (2006.01)

(52) U.S. Cl.
CPC ......... *C08L 27/06* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 4,245,070 A | 1/1981 | Kemp | |
| 5,194,498 A * | 3/1993 | Stevenson | ............. C08F 285/00 523/201 |

(Continued)

FOREIGN PATENT DOCUMENTS

| CA | 1082847 | 7/1980 |
| CN | 1177604 | 4/1998 |

(Continued)

OTHER PUBLICATIONS

PCT Search Report, Patent Cooperation Treaty, Mar. 9, 2015, Application No. PCT/KR2014/011373.

(Continued)

*Primary Examiner* — Christopher M Polley
(74) *Attorney, Agent, or Firm* — Lex IP Meister, PLLC

(57) ABSTRACT

The present invention relates to a polyvinyl chloride (PVC)-based compound composition, and more specifically, to a PVC-based compound composition that uses a PVC-based copolymer having internal plasticity prepared by suspension polymerization together with a PVC resin, thereby increasing compatibility with the PVC resin to shorten the gelling time, lowering the load at the time of extrusion to increase production in the same process conditions, and partially showing an impact modifier substitution effect.

10 Claims, 2 Drawing Sheets

(56) References Cited

U.S. PATENT DOCUMENTS

| | | | |
|---|---|---|---|
| 5,872,155 A | 2/1999 | Espiard | |
| 6,031,047 A | 2/2000 | Brady | |
| 6,479,147 B2 * | 11/2002 | Lubnin | C08F 259/04 |
| | | | 428/407 |
| 8,916,650 B2 * | 12/2014 | Kim | C08F 214/06 |
| | | | 428/407 |
| 2010/0331491 A1 * | 12/2010 | Kitayama | C08L 27/06 |
| | | | 525/222 |

FOREIGN PATENT DOCUMENTS

| | | |
|---|---|---|
| CN | 1186822 | 7/1998 |
| CN | 101516935 | 8/2009 |
| EP | 0850740 | 7/1998 |
| KR | 10-1998-0064773 | 10/1998 |
| KR | 10-2004-0057069 | 7/2004 |
| KR | 10-0915484 | 9/2009 |
| KR | 10-0964103 | 6/2010 |
| KR | 10-2010-0103008 | 9/2010 |
| KR | 10-2010-0105984 | 10/2010 |
| KR | 10-1236659 | 2/2013 |

OTHER PUBLICATIONS

Yang Bin et al., "Progress in research of vinyl chloride-acrylate copolymer resins", Polyvinyl Chloride., vol. 41, No. 4, Apr. 30, 2013.

* cited by examiner

[Fig. 1]
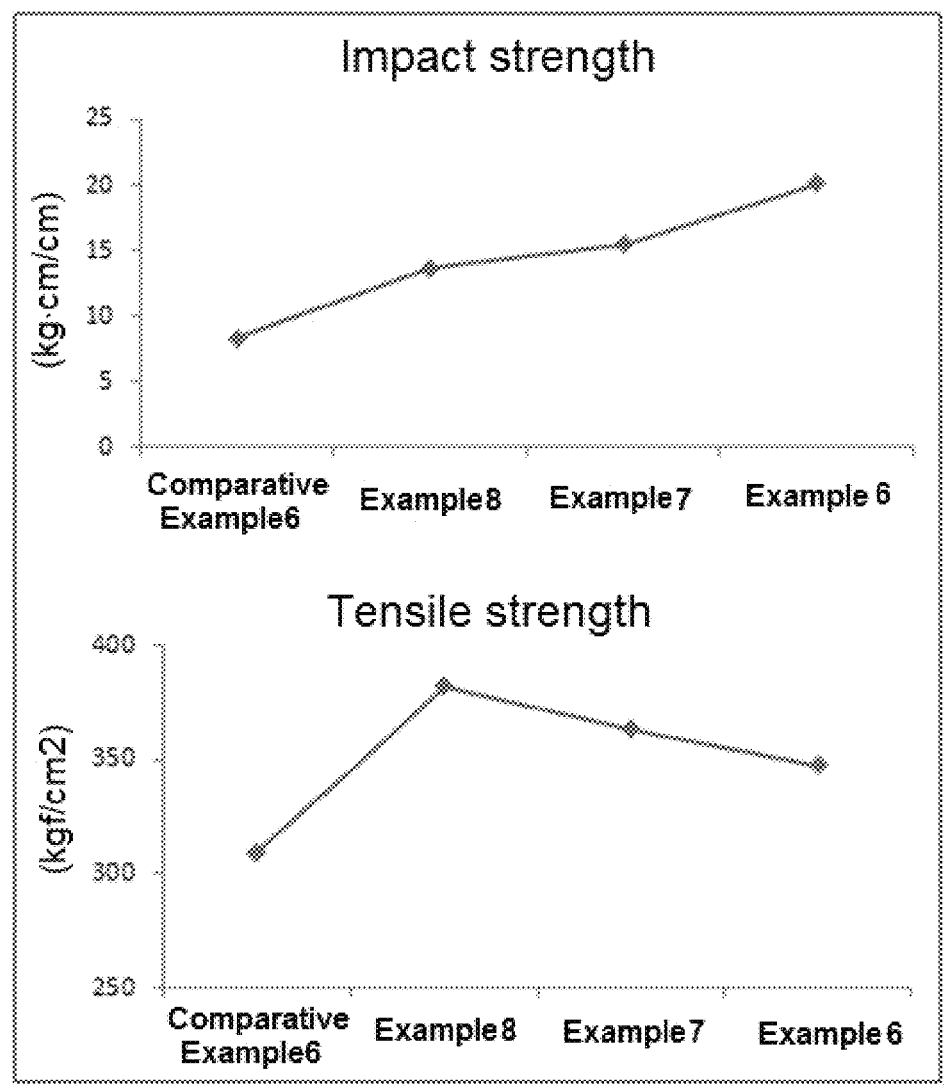

[Fig. 2]
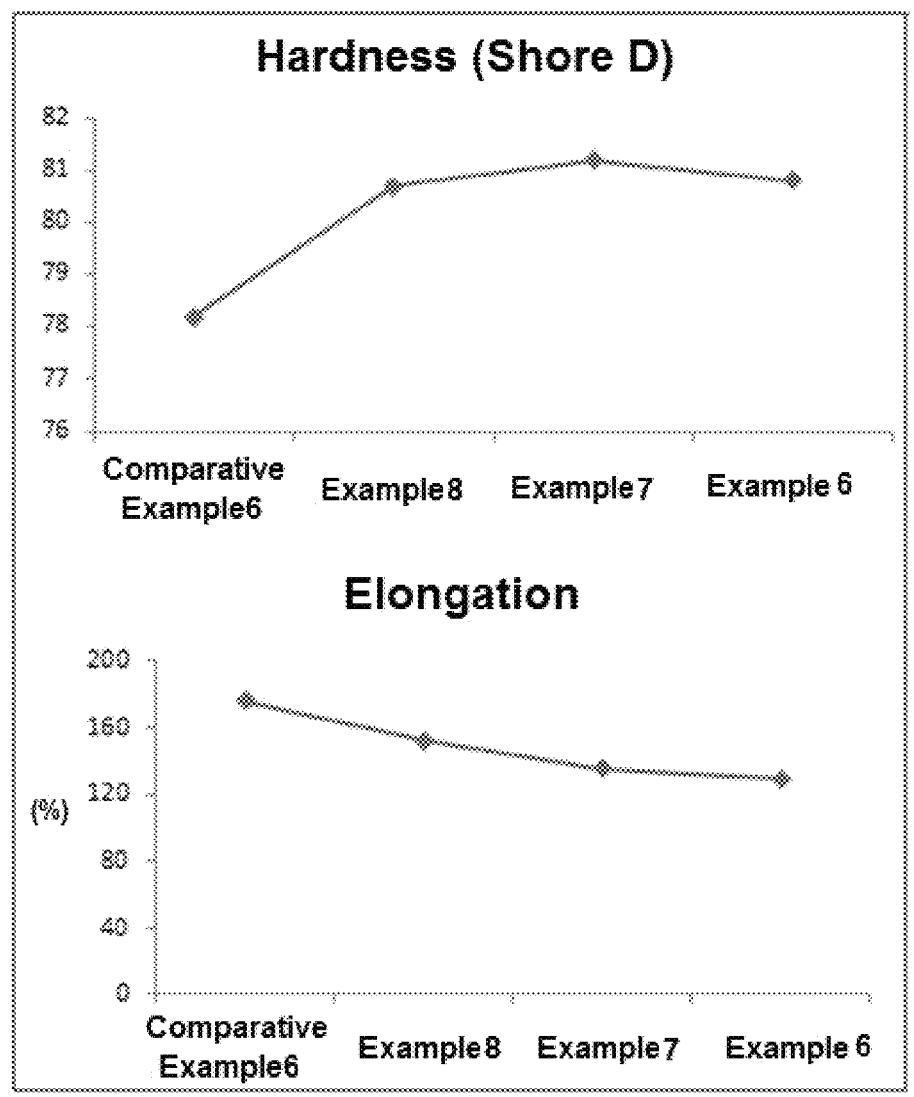

PVC-BASED COMPOUND COMPOSITION

TECHNICAL FIELD

The present invention relates to a polyvinyl chloride (PVC)-based compound composition used for a window frame and construction material of a window frame, automobile parts, general and water pipes, and the like.

BACKGROUND OF THE INVENTION

In general, a polyvinyl chloride (hereinafter, referred to as PVC) resin is a resin with wide usage that is most widely used for domestic and industrial materials, and is used for commercial products of various forms by polymerizing vinyl chloride monomers alone or copolymerizing with various monomers. Specific uses of the PVC resin include hard or soft shapes such as a film, a pipe, a window frame, a wall board, a floor material, an outdoor advertising sheet, wallpaper, a curtain, a mat, toys for infants, and the like.

However, a modifier necessarily required for processing of the PVC resin has problems in terms of compatibility with the PVC resin, migration according to passage of time, and the like. Thus, there is a demand for the development of a polyvinyl chloride-based compound composition with excellent formability and cost competitiveness, however, it is not easy to apply due to various problems such as low temperature impact resistance, plasticizer migration, and the like.

As a solution to the problems, U.S. Pat. No. 6,031,047 presents a reinforced weather resistant mixture of an acryl copolymer rubber-based core/shell impact modifier, however, there is a problem in that physical mixing of other powders or other starting materials is required when preparing a mixture with a copolymer.

Further, Korean Registered Patent No. 0964103 discloses an acryl-based impact modifier including a processing aid and a vinyl chloride resin composition including the same. However, according to this method, cost competitiveness is lowered because a modifier should be additionally used, a process load increases, and the plasticizer migration problem still remains. As a similar method, Korean Registered Patent No. 0915484 discloses an impact resistant hard PVC composition using a hydrocarbon rubber and chlorinated polyethylene, however, as explained above, problems still remain in terms of cost competitiveness due to the use of an additional modifier and plasticizer migration.

Korean Laid-Open Patent Publication No. 10-2010-0103008 discloses a PVC compound composition including a mixture of a PVC powder of a core/shell structure formed of a PVC core prepared by suspension polymerization and a PVC resin for coating prepared by emulsion polymerization, and an inner-plasticized PVC copolymer, however, a problem still remains in terms of cost competitiveness due to the introduction of a heat resistant plasticizer.

In addition, a composition including a vinyl chloride graft copolymer such as a vinyl acetate alkyl acrylate graft copolymer for improving impact strength and adhesion resistance has been developed, however, processability and formability are not good.

According to the method, due to the use of a modifier having totally different components from PVC, compatibility with the main material PVC is lowered or the process load increases.

DISCLOSURE

Technical Problem

It is an object of the invention to provide a PVC-based compound composition that uses a polyvinyl chloride-based copolymer having internal plasticity, thereby increasing compatibility with a PVC resin to improve processability and increase production, and simultaneously, to partially increase impact strength, and a method for preparing the same.

Technical Solution

In order to achieve the object, the present invention provides a PVC-based compound composition including: a PVC resin; a stabilizer; and a PVC-based copolymer having internal plasticity, wherein the PVC-based copolymer having internal plasticity uses a vinyl chloride-based copolymer resin of a core shell structure alone or in a mixture, which has a vinyl chloride-alkyl acrylate polymer having an alkyl group with a carbon number of 1 to 20 in a core, has a polyvinyl chloride structure in a shell, and includes 10 to 50 wt % of an alkyl acrylate having an alkyl group with a carbon number of 1 to 20, based on the total weight of the copolymer resin.

It is preferable that the PVC-based compound composition includes 0.1~10 parts by weight of the stabilizer and 1~50 parts by weight of the PVC-based copolymer having internal plasticity, based on 100 parts by weight of the PVC resin.

The PVC-based copolymer having internal plasticity may include 85 to 95 wt % of a core of a vinyl chloride-alkyl acrylate polymer having an alkyl group with a carbon number of 1 to 20 and 5 to 15 wt % of a shell of polyvinyl chloride.

The internal PVC-based copolymer may be a spherical particle having an average particle diameter of 50~250 μm in a powder state, and may have volumetric specific gravity of 0.3 to 0.7 (g/cc) and A shore hardness of 80 to 100.

The composition may further include at least one of additives selected from the group consisting of 1~50 parts by weight of a filler, 0.1~10 parts by weight of an impact modifier, 0.1~10 parts by weight of a processing aid, 0.1~30 parts by weight of a pigment, and 1~30 parts by weight of a plasticizer, based on 100 parts by weight of the PVC resin.

According to another embodiment of the invention, a processed product prepared from the above-explained PVC-based compound composition is provided.

The processed product may be: a hard product including a window frame, a pipe, siding, or a profile extrusion product; a soft product including a real photo paper, a calendar for a film and a sheet or a deco sheet; or a soft compound including a flame retardant electric wire, a non-flame-retardant electric wire, or automobile molding.

Advantageous Effects

The PVC-based compound composition of the present invention includes a specific PVC copolymer having internal plasticity, thereby shortening a gelling time, lowering an extrusion load, and maintaining or increasing process properties, without using or while reducing the use amount of a plasticizer, a processing aid, and the like that are essentially used in the prior art, thus increasing productivity under the same process temperature conditions and reducing energy consumption. Further, since the composition of the present invention has excellent compatibility, little additional modifiers are used, and migration may be reduced. Particularly, in the present invention, since expensive impact modifiers used for an impact modification effect in the prior art are partly replaced, cost competitiveness may be significantly increased.

BRIEF DESCRIPTION OF THE DRAWINGS

FIG. 1 shows results of impact strength and tensile strength of Examples 6 to 8 and Comparative Example 6.

FIG. 2 shows results of hardness and elongation of Examples 6 to 8 and Comparative Example 6.

DETAILED DESCRIPTION OF THE EMBODIMENT

Hereinafter, the present invention will be explained in detail. Conventional PVC-based compound compositions use a modifier such as a processing aid including a plasticizer so as to afford processability and formability, and use an impact modifier so as to reinforce impact strength. However, conventional methods are uneconomical due to a resultant cost increase, and still have problems in terms of processability and formability.

To the contrary, the present invention provides a PVC-based compound composition that uses a specific copolymer resin prepared by suspension polymerization, preferably a vinyl chloride-based copolymer resin having internal plasticity together with a PVC resin, and thus reduces the use amount of processing aids or impact modifiers commonly used in the existing PVC-based compound compositions or ultimately does not use the same, thereby reducing the use amount of sub-materials compared to the existing compound compositions.

The PVC-based copolymer having internal plasticity has excellent compatibility with PVC resin, thus improving gellability of PVC and shortening the gelling time. Thus, the present invention may afford compatibility and a cost reduction effect as well as excellent processability and formability, even without the existing modifiers or impact modifiers, plasticizers, and the like. According to one embodiment of the invention, provided is a PVC-based compound composition including: a PVC resin; a stabilizer; and the PVC-based copolymer having internal plasticity, wherein the PVC-based copolymer having internal plasticity uses a vinyl chloride-based copolymer resin of a core shell structure alone or in a mixture, which has a vinyl chloride-alkyl acrylate polymer having an alkyl group with a carbon number of 1 to 20 in a core, has a polyvinyl chloride structure in a shell, and includes 10 to 50 wt % of alkyl acrylate having an alkyl group with a carbon number of 1 to 20, based on the total weight of the copolymer resin.

In addition, if necessary, the PVC-based compound composition may further include at least one of additives selected from the group consisting of a filler, an impact modifier, a processing aid, and a plasticizer. Thus, the present invention may provide a PVC-based compound composition including a PVC resin, a stabilizer, and an internal PVC copolymer, to which an impact modifier, a stabilizer, a filler, and the like are mixed.

The components of the PVC-based compound composition of the present invention will now be explained in detail.

As explained above, the present invention uses a specific PVC copolymer having internal plasticity, thereby shortening a gelling time, reducing an extrusion load, and contributing to improvement in cold extrusion processability and productivity.

The PVC-based copolymer having internal plasticity, unlike general processing aids, does not increase the extrusion load even if a gelling time is shortened, and thus is easy to process and has an energy use reduction effect. The PVC copolymer having internal plasticity also has excellent gellability and shortens the gelling time, thereby lowering the processing temperature, and may reduce the extrusion load to increase extrusion processability.

The specific PVC-based copolymer resin partly exhibits the effect of impact modification and the properties of a processing aid. However, according to circumstances, impact modifiers and processing aids may be additionally used in the PVC-based compound composition, so as to further improve impact strength. Thus, if a composition including the PVC copolymer having internal plasticity is used, expensive impact modifiers and processing aids may be replaced, thus enabling a mixed cost reduction, and productivity may be improved due to excellent processability, and thus it is expected to have a high value for practical use as new products capable of securing cost competitiveness of finished products.

The PVC-based copolymer having internal plasticity is a vinyl chloride-based copolymer resin of a core shell structure, which has a vinyl chloride-alkyl acrylate polymer having an alkyl group with a carbon number of 1 to 20 in a core, has a polyvinyl chloride structure in a shell, and includes 10 to 50 wt % of alkyl acrylate having an alkyl group with a carbon number of 1 to 20, based on the total weight of the copolymer resin.

Specifically, the PVC-based copolymer having internal plasticity has a particle morphology wherein a vinyl chloride-alkyl acrylate copolymer having an alkyl group with a carbon number of 1 to 20 exists as a core and polyvinyl chloride particles surround them in a shell structure.

And, the PVC-based copolymer having internal plasticity may include 85 to 95 wt % of a core of a vinyl chloride-alkyl acrylate polymer having an alkyl group with a carbon number of 1 to 20 and 5 to 15 wt % of a shell of polyvinyl chloride.

The PVC-based copolymer having internal plasticity may be spherical particles having an average particle diameter of 50~250 μm in a powder state, and may have volumetric specific gravity of 0.3 to 0.7 (g/cc) and A shore hardness of 80 to 100.

The PVC-based copolymer having internal plasticity is prepared by suspension polymerization using each of the monomers, and may preferably be prepared by: (a) mixing 0.09 to 0.6 parts by weight of a suspending agent and 0.05 to 0.15 parts by weight of an initiator, based on 100 parts by weight of the total amount of vinyl chloride monomers and alkyl acrylate monomers, and initiating a reaction at a polymerization temperature of 40 to 60° C.; and (b) continuously or non-continuously dividedly introducing 5 to 43 parts by weight of alkyl acrylate monomers, based on 100 parts by weight of the total amount of vinyl chloride monomers and alkyl acrylate monomers, into the polymerization reactant of the step (a) for 3 to 7 h, and conducting suspension polymerization at a polymerization temperature of 45 to 70° C.

The step (a) is a reaction initiation step for providing a core of a vinyl chloride-alkyl acrylate copolymer, wherein the initial reaction mixture used for the copolymerization includes vinyl chloride monomers, a suspending agent, and an initiator. Preferably, in the present invention, two or more kinds of the suspending agents and the initiators may be used. Further, if necessary, additives that are well known in this field may be used, and for example, a defoaming agent, a buffering agent, a stabilizer, and the like may be used.

In the step (b), after the initiation reaction, alkyl acrylate monomers are continuously added or divided in a fixed amount and non-continuously added, thereby completing the structure of a core of a vinyl chloride-alkyl acrylate copolymer, and simultaneously, forming polyvinyl chloride in a shell structure outside of the core.

Herein, it is preferable that the alkyl acrylate monomer used in the step (b) has an alkyl group having a carbon number of 1 to 20, and more preferably, an alkyl group having a carbon number of 1 to 10. Further, most preferably, the alkyl acrylate monomer may be butyl acrylate.

Thus, the core of a vinyl chloride-alkyl acrylate copolymer may be one having an alkyl group having a carbon number of 1 to 20, and most preferably, a vinyl chloride-butyl acrylate copolymer.

The suspending agent may include a mixture of a first suspending agent selected from a polyvinyl alcohol-based suspending agent with a saponification degree of 60 to 80%, a cellulose-based suspending agent, and a mixture thereof, and a second suspending agent selected from a polyvinyl alcohol-based suspending agent with a saponification degree of 30 to 50%, 20 to 40% of a hydroxylated cellulose-based suspending agent, and a mixture thereof. The suspending agent may include a first suspending agent selected from a polyvinyl alcohol-based suspending agent with a saponification degree of 50 to 80%, a cellulose-based suspending agent, and a mixture thereof.

As the initiator, at least one compound selected from the group consisting of a peroxide type of polymerization initiator and an azo type of polymerization initiator may be used, and more preferably, two or more kinds thereof are used. Specifically, as the initiator, low temperature and high temperature initiators may be used.

Such a PVC-based compound composition of the present invention includes 1 to 50 parts by weight of the specific PVC-based copolymer having internal plasticity and a certain amount of sub-materials, based on 100 parts by weight of the PVC resin.

Specifically, it is preferable that the PVC-based copolymer having internal plasticity is used in an amount of 1 to 50 parts by weight, or 2 to 40 parts by weight, or 3 to 20 parts by weight, based on 100 parts by weight of the PVC resin. If the content of the PVC-based copolymer having internal plasticity is less than 1 part by weight, the effects of improving processability and physical properties are very insignificant, and if it is greater than 50 parts by weight, softening may progress to change the unique properties of the original product.

The stabilizer is used to improve stability of the PVC-based compound composition. The stabilizer may be at least one selected from the group consisting of inorganic salts and organic salts of metals such as calcium, zinc, tin, magnesium sodium, and potassium. Preferable examples of the stabilizer may include at least one selected from the group consisting of calcium stearate, sodium stearate, potassium stearate, zinc stearate, magnesium stearate, tin stearate, and a mixture of the metal salts.

The PVC-based compound composition of the present invention may further include at least one of additives selected from the group consisting of a filler, an impact modifier, a processing aid, a pigment, and a plasticizer. The content of the additives are not specifically limited, and it may be used according to the methods that are well known in this field. However, the present invention uses a smaller amount of the processing aids and plasticizers, compared to the existing compositions.

For example, the composition may further include at least one of additives selected from the group consisting of 1~50 parts by weight of a filler, 0.1~10 parts by weight of an impact modifier, 0.1~10 parts by weight of a processing aid, 0.1~30 parts by weight of a pigment, and 1~30 parts by weight of a plasticizer, based on 100 parts by weight of the PVC resin.

Herein, according to one embodiment of the invention, if at least one additive selected from the group consisting of a filler, an impact modifier, a processing aid, and a pigment is included in the PVC-based compound composition, the composition may be used for processing hard products.

Further, if at least one additive selected from the group consisting of a filler, an impact modifier, a processing aid, a pigment, and a plasticizer is included in the PVC-based compound composition, the composition may be used for processing soft products.

As the filler, both inorganic fillers and organic fillers may be used. Examples of the inorganic fillers may include at least one selected from the group consisting of kaolin, calcium carbonate, aluminum hydroxide, clay, silica, and talc. As the filler, a powder having an average particle diameter of 0.1 to 10 μm may be preferably used.

The impact modifier may be at least one selected from the group consisting of acryl-based, MBS (methyl methacrylate-butadiene styrene)-based, and CPE (chlorinated polyethylene)-based impact modifiers.

The processing aid may be at least one selected from the group consisting of acrylates and methacrylates, a styrene/methacrylate copolymer, an acrylonitrile/butadiene/styrene copolymer, a styrene/acrylonitrile copolymer, and poly(alpha-methylstyrene).

As the pigment, an organic and inorganic pigment or toner and the like that are well known in this field may be used, and for example, the pigment may be at least one selected from the group consisting of carbon black, titanium dioxide, and a metal-based toner.

As the plasticizer, a phthalate-based or non-phthalate-based plasticizer and the like may be used, and the kind is not limited. For example, the phthalate-based plasticizer may include at least one selected from the group consisting of dibutyl phthalate (DBP), dioctyl phthalate (DOP), di-isononyl phthalate (DINP), di-isodecyl phthalate (DIDP), butyl benzyl phthalate (BBP) and the like. Further, the non-phthalate-based plasticizer may include at least one selected from the group consisting of dioctyl terephthalate (DOTP), dioctyl adipate (DOA), trioctyl trimellitate (TOTM), acetyltributyl citrate (ATBC), 1,2-cyclohexane dicarboxylic acid di-isononyl ester (DINCH), and the like.

According to another embodiment of the invention, a processed product prepared from the above-explained PVC-based compound composition is provided.

The processed product may be a hard product including a window frame, a pipe, siding, or a profile extrusion product; a soft product including a real photo paper, a calendar for a film, and a sheet or a deco sheet; and a soft compound including a flame retardant electric wire, a non-flame-retardant electric wire, or an automobile molding.

Specifically, the PVC-based compound composition may be mainly used for extrusion profile product such as a window frame, a pipe, or siding, In addition, the PVC-based compound composition may also be used for a soft composition such as a deco sheet or a print paper, an electric wire, and various automobile moldings, as well as a hard extrusion profile product.

In addition, since the composition of the present invention has excellent compatibility and processability, it may lower the processing temperature and reduce the use amount of modifiers. On the other hand, it may improve low temperature impact resistance. Thus, the PVC-based compound composition of the present invention may be usefully used in a variety of processed products.

According to one preferable example of the processed product of the present invention, when a hard product is prepared, the PVC-based compound composition may include 1~50 parts by weight of the PVC-based copolymer having internal plasticity, 0.1~10 parts by weight of a stabilizer, 0~50 parts by weight of a filler, 0~10 parts by weight of an impact modifier, 0~10 parts by weight of a processing aid, and 0~30 parts by weight of a pigment, based on 100 parts by weight of the PVC resin.

When a soft product is prepared, the PVC-based compound composition may include 1~50 parts by weight of the PVC-based copolymer having internal plasticity, 0.1~10 parts by weight of a stabilizer, 0~50 parts by weight of a filler, 0~10 parts by weight of an impact modifier, 0~10 parts by weight of a processing aid, 0~30 parts by weight of a pigment, and 5~50 parts by weight of a plasticizer, based on 100 parts by weight of the PVC resin.

Hereinafter, preferable examples are presented to aid in understating of the present invention, but these examples are only to illustrate the invention, and the scope of the invention is not limited thereto.

Example 1

Each composition for a window frame of Examples 1 to 3 and Comparative Example 1 to 3 was prepared with the compositions and the contents as shown in the following Table 1 (unit: parts by weight).

Thereafter, for Examples 1 to 3 and Comparative Examples 1 to 3, physical properties were measured by the following methods, and the results are shown in Table 1.

For gelling time, maximum torque, and stabilization torque, 57 g of the compound was measured using a Brabender plastomill at 160° C. and 30 rpm.

Tensile strength was measured according to the standard of KS M3006.

Low temperature falling weight impact was measured according to the standard of KS F5602.

Extrusion load and extrusion amount were measured using a single screw extruder (Brabender Extruder, 19 mm) at 170~200° C. and 50 rpm.

TABLE 1

|  | Example 1 | Example 2 | Example 3 | Comparative Example 1 | Comparative Example 2 | Comparative Example 3 |
|---|---|---|---|---|---|---|
| PVC | 100 | 100 | 100 | 100 | 100 | 100 |
| Stabilizer | 6 | 5 | 5 | 6 | 5 | 5 |
| Pigment | 1.2 | 3 | 3 | 1.2 | 3 | 3 |
| Acryl impact modifier | — | — | 2 | 4 | 3.6 | 4 |
| CPE | 6 | 4 | 3 | 6 | 2.4 | 3 |
| Processing aid | 1 | — | — | 2 | X | X |
| Filler | 15 | 10 | 10 | 12 | 10 | 10 |
| vinyl chloride-based copolymer having internal plasticity | 8 | 6 | 4 | — | — | — |
| Gelling time (s) | 146 | 214 | 196 | 170 | 422 | 418 |
| Maximum torque (Nm) | 37 | 32 | 41 | 45 | 37 | 45 |
| Stabilization torque (Nm) | 36 | 35 | 39 | 41 | 38 | 43 |
| Tensile strength (kg/cm$^2$) | 453 | 388 | 421 | 456 | 378 | 407 |
| Low temperature falling weight impact | Not destroyed | Not destroyed | Not destroyed | Not destroyed | Not destroyed | Not destroyed |
| Extrusion load (amps) | 70 | 54 | 30 | 79 | 58 | 32 |
| Extrusion amount (m/min) | 1.8 | 2.9 | 2.1 | 1.5 | 2.2 | 1.9 | note)
*PVC: Polyvinyl chloride, P-1000, Hanwha Chemical (Mw: 100,000~120,000)
*stabilizer: Pb-based stabilizer, LDF-340, Rheo Chemical
*pigment: titanium dioxide (TiO$_2$), R-902, DuPont
*acryl impact modifier: KM-334, Dow Chemical
*CPE: Chlorinated Polyethylene, CPE135A, Weifang Chemical Co., Ltd.
*processing aid: K-125, Dow Chemical
*filler: calcium carbonate, OMYA 1T, OMYA
*vinyl chloride-based copolymer having internal plasticity: vinyl chloride-based copolymer resin powder of a core-shell structure with the properties of Table 2 and FIG. 1, which has a vinyl chloride-butyl acrylate polymer in the core, has a polyvinyl chloride structure in the shell, and contains 40 wt % of butyl acrylate in the copolymer, based on the total weight of the copolymer resin.

TABLE 2

|  | Test method | Unit | Test condition | Standard |
|---|---|---|---|---|
| Particle size | HCC | % | 32 mesh pass | 100 |
| Apparent specific gravity | ASTM D1895-90 | g/cm$^3$ | — | 0.55 or less |
| Average particle diameter | HCC | μm | — | 100~150 |
| Volatile content | ASTM D3030-90 | % | 105° C. × 1 h | Max 0.5 |

As shown in Table 1, for a composition for a window frame, in the case of Example 1 wherein the vinyl chloride-based copolymer having internal plasticity is used, although it does not use a processing aid, gelling time is shortened, and gelling load is lowered compared to Comparative Example 1, thus decreasing a load on the extruder at the time of extrusion. Thereby, a screw rotation speed may be increased under the same temperature condition, thus increasing extrusion amount, and thus a productivity increase effect may be anticipated. Further, even if an acryl impact modifier is reduced by 50%, the low temperature falling weight impact is at a non-destructive level, and tensile strength is maintained at an equivalent level or increases somewhat.

In the case of Example 2 wherein a vinyl chloride copolymer is used, compared to Comparative Example 2, gelling time is shortened and gelling load is lowered without a processing aid, thus reducing the extrusion load on the extruder, and thus a productivity increase effect may be anticipated.

In the case of Example 3 wherein the vinyl chloride copolymer having internal plasticity is used, compared to Comparative Example 3, although an acryl impact modifier is reduced by 50%, low temperature impact resistance is maintained, and simultaneously gelling time is shortened without a processing aid, and thus a productivity increase effect may be anticipated.

Examples 4 to 5 and Comparative Examples 4 to 5

Each pipe composition of Examples and Comparative Examples was prepared with the compositions and the contents as shown in the following Table 3 (unit: parts by weight).

By the above-explained methods, properties such as gelling time and the like were measured, and the results are shown in Table 3.

TABLE 3

|  | Example 4 | Example 5 | Comparative Example 4 | Comparative Example 5 |
|---|---|---|---|---|
| PVC | 100 | 100 | 100 | 100 |
| Stabilizer | 5.6 | 4 | 5.6 | 4 |
| Filler | 1.7 | 12.5 | 1.7 | 12.5 |
| Pigment | 3 | 3 | 3 | 3 |
| Acryl impact modifier | 6.8 | 1 | 7.8 | 2 |
| CPE | — | 2 | 2.2 | 3 |
| Processing aid | — | — | — | 1 |
| vinyl chloride-based copolymer having internal plasticity | 6 | 6 | — | — |
| Gelling time (s) | 140 | 140 | 104 | 272 |
| Maximum torque (Nm) | 29 | 46 | 32 | 50 |
| Stabilization torque (Nm) | 29 | 39 | 30 | 42 |
| Tensile strength (kg/cm$^2$) | 447 | 439 | 417 | 443 |
| Impact strength (kgcm/cm) | 44 | 20 | 39 | 21 | note)
PVC: Polyvinyl chloride, P-1000, Hanwha Chemical (Mw: 100,000~120,000)
stabilizer: Pb-based stabilizer, SKP-300, SK
pigment: titanium dioxide (TiO$_2$), R-902, DuPont
acryl impact modifier: KM-334, Dow Chemical
CPE: Chlorinated Polyethylene, CPE135A, Weifang Chemical Co., Ltd.
processing aid: K-125, Dow Chemical
filler: calcium carbonate, OMYA 1T, OMYA
vinyl chloride-based copolymer having internal plasticity: same as Example 1

As shown in Table 3, as to a pipe composition, although Example 4 has a longer gelling time compared to Comparative Example 4, maximum torque and stabilization torque decrease and impact strength increases.

In the case of the siding composition of Example 5 wherein the vinyl chloride-based copolymer having internal plasticity is used, compared to Comparative Example 5, gelling time is shortened without using a processing aid, and maximum torque and stabilization torque simultaneously decrease, and thus a productivity increase is anticipated, and tensile strength and impact strength are maintained even if the amount of a CPE impact modifier is reduced.

Examples 6 to 8 and Comparative Example 6

Each soft deco sheet composition of Examples and Comparative Example was prepared with the compositions and the contents as shown in the following Table 4 (unit: parts by weight).

By the above-explained methods, properties such as gelling time and the like were measured and the results are shown in Table 3. Further, the results of impact strengths and tensile strengths of Examples 6 to 8 and Comparative Example 6 according to the use of the PVC copolymer having internal plasticity are shown in FIG. 1, and the results of hardnesses and elongations of Examples 6 to 8 and Comparative Example 6 are shown in FIG. 2.

TABLE 4

|  | Example 6 | Example 7 | Example 8 | Comparative Example 6 |
|---|---|---|---|---|
| PVC | 100 | 100 | 100 | 100 |
| Stabilizer | 3 | 3 | 3 | 3 |
| Filler | 5 | 5 | 5 | 5 |
| Pigment | 5 | 5 | 5 | 5 |
| Plasticizer | — | 5 | 10 | 15 |
| vinyl chloride-based copolymer having internal plasticity | 15 | 10 | 5 | — |
| Gelling time (s) | 36 | 40 | 28 | 172 |
| Stabilization torque (Nm) | 48 | 49 | 49 | 47 |
| Tensile strength (kg/cm$^2$) | 347 | 363 | 382 | 309 |
| Impact strength (kgcm/cm) | 20 | 15 | 14 | 8 |
| hardness (shore-D) | 80.8 | 81.2 | 80.7 | 78.2 |
| VSP (° C., 1 kg) | 83.6 | 76.3 | 72.1 | 71.5 |
| Weather resistance (YI, 300 h) | 21.31 | 23.54 | 30.7 | 29.41 | note)
PVC: Polyvinyl chloride, P-1000, Hanwha Chemical (Mw: 100,000~120,000)
stabilizer: Ba/Zn-based stabilizer, BZ-150T, Songwon Chemical
pigment: titanium dioxide (TiO$_2$), R-902, DuPont
acryl impact modifier: KM-334, Dow Chemical
filler: calcium carbonate, (OYMA 1T, OMYA)
plasticizer: DOP, Hanwha Chemical
vinyl chloride-based copolymer having internal plasticity: the same material as Example 1

As shown in Table 4 and FIGS. 1 and 2, it is confirmed that for a deco sheet composition, Examples 6 to 8 have the effect of rapid shortening of gelling time according to the added amount of the vinyl chloride-based copolymer having internal plasticity compared to Comparative Example 6, and stabilization torque and tensile strength are maintained and impact strength increases according to the content of the vinyl chloride-based copolymer having internal plasticity. Further hardness is maintained according to the contents of the plasticizer and the PVC copolymer having internal plasticity.

The invention claimed is:

1. A PVC-based compound composition comprising: a PVC resin; a stabilizer; and aPVC-based copolymer having internal plasticity,
wherein the PVC-based copolymer having internal plasticity uses a vinyl chloride-based copolymer resin of a core shell structure alone or in a mixture, which has a vinyl chloride-alkyl acrylate polymer having an alkyl group with a carbon number of 1 to 20 in a core, has a polyvinyl chloride structure in a shell, and includes 10 to 50 wt % of an alkyl acrylate having an alkyl group with a carbon number of 1 to 20, based on the total weight of the copolymer resin.

2. The PVC-based compound composition according to claim 1, wherein the composition comprises 0.1~10 parts by weight of the stabilizer and 1~50 parts by weight of the PVC-based copolymer having internal plasticity, based on 100 parts by weight of the PVC resin.

3. The PVC-based compound composition according to claim 1, wherein the PVC-based copolymer having internal plasticity includes 85 to 95 wt % of a core of a vinyl chloride-alkyl acrylate polymer having an alkyl group having a carbon number of 1 to 20 and 5 to 15 wt % of a shell of polyvinyl chloride.

4. The PVC-based compound composition according to claim 1, wherein the PVC-based copolymer having internal plasticity is a spherical particle having an average particle diameter of 50~250 μm in a powder state, and has volumetric specific gravity of 0.3 to 0.7 (g/cc) and A shore hardness of 80 to 100.

5. The PVC-based compound composition according to claim 1, further comprising at least one of additives selected from the group consisting of 1~50 parts by weight of a filler, 0.1~10 parts by weight of an impact modifier, 0.1~10 parts by weight of a processing aid, 0.1~30 parts by weight of a pigment, and 1~30 parts by weight of a plasticizer, based on 100 parts by weight of the PVC resin.

6. The PVC-based compound composition according to claim 1, wherein as the PVC resin, a resin of a polymerization degree of 700~1700 is used alone or in a mixture.

7. The PVC-based compound composition according to claim 5, wherein the filler is at least one selected from the group consisting of kaolin, calcium carbonate, aluminum hydroxide, clay, silica, and talc.

8. The PVC-based compound composition according to claim 5, wherein the impact modifier is at least one selected from the group consisting of acryl-based, MBS (methyl methacrylate-butadiene styrene)-based, and CPE (chlorinated polyethylene) impact modifiers.

9. A processed product prepared from the PVC-based compound composition according to claim 1.

10. The processed product according to claim 9, wherein the product is a hard product including a window frame, a pipe, siding, or a profile extrusion product; a soft product including a real photo paper, a calendar for a film, and a sheet or a deco sheet; or a soft compound including a flame retardant electric wire, a non-flame-retardant electric wire, or an automobile molding.

* * * * *